United States Patent
Lenahan et al.

(10) Patent No.: US 9,301,015 B2
(45) Date of Patent: Mar. 29, 2016

(54) USER COMMENTARY SYSTEMS AND METHODS

(71) Applicant: eBay Inc., San Jose, CA (US)

(72) Inventors: Michael George Lenahan, Moraga, CA (US); Amanda Johnson, San Francisco, CA (US); Ben Mitchell, Oakland, CA (US); Chahn Chung, San Francisco, CA (US); Linda Young, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/559,661

(22) Filed: Dec. 3, 2014

(65) Prior Publication Data

US 2015/0089529 A1    Mar. 26, 2015

Related U.S. Application Data

(63) Continuation of application No. 13/566,829, filed on Aug. 3, 2012, now Pat. No. 8,914,365.

(60) Provisional application No. 61/515,254, filed on Aug. 4, 2011.

(51) Int. Cl.
*G06F 17/30* (2006.01)
*H04N 21/478* (2011.01)
(Continued)

(52) U.S. Cl.
CPC .... *H04N 21/47815* (2013.01); *G06F 17/30595* (2013.01); *H04N 21/2542* (2013.01); *H04N 21/4126* (2013.01); *H04N 21/42208* (2013.01); *H04N 21/4756* (2013.01); *H04N 21/4758* (2013.01); *H04N 21/4788* (2013.01)

(58) Field of Classification Search
CPC ................................................. G06F 17/30595
USPC ........................................................ 707/736
See application file for complete search history.

(56) References Cited

U.S. PATENT DOCUMENTS 5,432,542 A    7/1995 Thibadeau et al.
5,960,411 A    9/1999 Hartman et al.
(Continued)

FOREIGN PATENT DOCUMENTS

JP    2005142975 A    6/2005
KR    1020110040882 A    4/2011
(Continued)

OTHER PUBLICATIONS

"U.S. Appl. No. 13/409,726, Appeal Brief filed Oct. 23, 2013", 18 pgs.
(Continued)

*Primary Examiner* — Noosha Arjomandi
(74) *Attorney, Agent, or Firm* — Schwegman Lundberg & Woessner, P.A.

(57) ABSTRACT

Systems and methods to display content are described. In some embodiments, program content is received from a content source. A method identifies product-related metadata associated with the program content where the product-related metadata includes at least one item displayed in the program content. The program content is communicated to a display device for presentation to a user in a first portion of the display device. The product-related metadata is communicated to the display device for presentation to the user in a second portion of the display device.

16 Claims, 9 Drawing Sheets

(51) Int. Cl.
*H04N 21/41* (2011.01)
*H04N 21/422* (2011.01)
*H04N 21/475* (2011.01)
*H04N 21/4788* (2011.01)
*H04N 21/254* (2011.01)

(56) References Cited

U.S. PATENT DOCUMENTS

| | | | |
|---|---|---|---|
| 5,969,714 | A | 10/1999 | Butcher |
| 6,282,548 | B1 | 8/2001 | Burner et al. |
| 7,103,908 | B2 | 9/2006 | Tomsen |
| 7,353,183 | B1 * | 4/2008 | Musso .................. G06Q 10/00 705/313 |
| 7,536,706 | B1 | 5/2009 | Sezan et al. |
| 7,668,821 | B1 * | 2/2010 | Donsbach ......... G06F 17/30867 707/765 |
| 7,725,362 | B2 | 5/2010 | Weathers, Jr. |
| 7,774,817 | B2 | 8/2010 | Gupta |
| 8,296,314 | B2 | 10/2012 | Nemirofsky et al. |
| 8,566,855 | B2 | 10/2013 | Wong et al. |
| 9,020,415 | B2 | 4/2015 | Buehler et al. |
| 2002/0065802 | A1 * | 5/2002 | Uchiyama ......... G06F 17/30867 |
| 2004/0194148 | A1 | 9/2004 | Schultz et al. |
| 2005/0055640 | A1 | 3/2005 | Alten |
| 2005/0093868 | A1 | 5/2005 | Hinckley |
| 2005/0120391 | A1 | 6/2005 | Haynie et al. |
| 2005/0138668 | A1 | 6/2005 | Gray et al. |
| 2005/0149987 | A1 | 7/2005 | Boccon-Gibod et al. |
| 2005/0193425 | A1 | 9/2005 | Sull et al. |
| 2006/0291506 | A1 | 12/2006 | Cain |
| 2007/0089136 | A1 | 4/2007 | Kumai et al. |
| 2008/0077703 | A1 | 3/2008 | Lee |
| 2008/0077965 | A1 | 3/2008 | Kamimaki et al. |
| 2008/0098450 | A1 | 4/2008 | Wu et al. |
| 2008/0109841 | A1 | 5/2008 | Heather et al. |
| 2008/0141303 | A1 | 6/2008 | Walker et al. |
| 2008/0229353 | A1 | 9/2008 | Morris et al. |
| 2008/0243816 | A1 | 10/2008 | Chan et al. |
| 2008/0244638 | A1 | 10/2008 | Ryden |
| 2008/0259222 | A1 | 10/2008 | Hardacker et al. |
| 2008/0263472 | A1 | 10/2008 | Thukral et al. |
| 2009/0049483 | A1 | 2/2009 | Townsend et al. |
| 2009/0055538 | A1 | 2/2009 | Conradt et al. |
| 2009/0106307 | A1 | 4/2009 | Spivack |
| 2009/0128335 | A1 | 5/2009 | Leung |
| 2009/0144772 | A1 | 6/2009 | Fink et al. |
| 2009/0158214 | A1 | 6/2009 | Arnold et al. |
| 2009/0300547 | A1 | 12/2009 | Bates et al. |
| 2009/0327894 | A1 | 12/2009 | Rakib et al. |
| 2010/0030578 | A1 | 2/2010 | Siddique et al. |
| 2010/0037149 | A1 | 2/2010 | Heath |
| 2010/0037277 | A1 | 2/2010 | Flynn-Ripley et al. |
| 2010/0060802 | A1 | 3/2010 | Huegel |
| 2010/0094729 | A1 | 4/2010 | Gray et al. |
| 2010/0146560 | A1 | 6/2010 | Bonfrer et al. |
| 2010/0211900 | A1 | 8/2010 | Fujioka |
| 2010/0229196 | A1 | 9/2010 | Lee et al. |
| 2010/0235259 | A1 | 9/2010 | Farraro et al. |
| 2010/0262987 | A1 | 10/2010 | Imanilov et al. |
| 2010/0269146 | A1 | 10/2010 | Britt |
| 2010/0293576 | A1 | 11/2010 | Hnyk et al. |
| 2011/0032191 | A1 | 2/2011 | Cooke et al. |
| 2011/0078726 | A1 | 3/2011 | Rosenberg et al. |
| 2011/0099064 | A1 * | 4/2011 | Lyon .................. G06Q 30/0251 705/14.49 |
| 2011/0134320 | A1 | 6/2011 | Daly et al. |
| 2011/0138300 | A1 | 6/2011 | Kim et al. |
| 2011/0208418 | A1 * | 8/2011 | Looney .................. G06Q 30/06 701/532 |
| 2011/0247042 | A1 | 10/2011 | Mallinson |
| 2011/0321071 | A1 | 12/2011 | McRae |
| 2012/0198531 | A1 | 8/2012 | Ort et al. |
| 2012/0227073 | A1 | 9/2012 | Hosein et al. |
| 2012/0253972 | A1 | 10/2012 | Oskolkov et al. |
| 2012/0254927 | A1 | 10/2012 | Kim et al. |
| 2013/0117262 | A1 | 5/2013 | Lenahan et al. |
| 2013/0117788 | A1 | 5/2013 | Glasgow |
| 2013/0152128 | A1 | 6/2013 | Tanna et al. |
| 2014/0201230 | A1 | 7/2014 | Messer et al. |
| 2014/0310754 | A1 | 10/2014 | Collart et al. |
| 2014/0316935 | A1 | 10/2014 | Robertson |

FOREIGN PATENT DOCUMENTS

| | | |
|---|---|---|
| WO | WO-2012118976 A2 | 9/2012 |
| WO | WO-2013020098 A2 | 2/2013 |
| WO | WO-2013020102 A1 | 2/2013 |

OTHER PUBLICATIONS

"U.S. Appl. No. 13/409,726, Decision on Appeal Brief mailed Sep. 23, 2013", 2 pgs.

"U.S. Appl. No. 13/409,726, Examiner's Answer mailed Jan. 31, 2014", 16 pgs.

"U.S. Appl. No. 13/409,726, Final Office Action mailed Jun. 4, 2013", 14 pgs.

"U.S. Appl. No. 13/409,726, Non Final Office Action mailed Jan. 16, 2013", 14 pgs.

"U.S. Appl. No. 13/409,726, Pre-Appeal Brief Request filed Aug. 5, 2013", 5 pgs.

"U.S. Appl. No. 13/409,726, Response filed Apr. 15, 2013 to Non Final Office Action mailed Jan. 16, 2013", 13 pgs.

"U.S. Appl. No. 13/566,829, Final Office Action mailed Nov. 4, 2013", 17 pgs.

"U.S. Appl. No. 13/566,829, Non Final Office Action mailed May 7, 2013", 15 pgs.

"U.S. Appl. No. 13/566,829, Response filed Mar. 4, 2014 to Final Office Action mailed Nov. 4, 2013", 11 pgs.

"U.S. Appl. No. 13/566,829, Response filed Aug. 6, 2013 to Non Final Office Action mailed May 7, 2013", 15 pgs.

"U.S. Appl. No. 13/566,857, Response filed Feb. 13, 2014 to Final Office Action mailed Nov. 14, 2013", 13 pgs.

"U.S. Appl. No. 13/566,857, Final Office Action mailed Nov. 14, 2013", 17 pgs.

"U.S. Appl. No. 13/566,857, Non Final Office Action mailed Jun. 13, 2013", 11 pgs.

"U.S. Appl. No. 13/566,857, Response filed Sep. 10, 2013 to Non Final Office Action mailed Jun. 13, 2013", 12 pgs.

"Australian Application Serial No. 2012289866, Office Action mailed Mar. 10, 2015", 3 pgs.

"Australian Application Serial No. 2012289870, First Examiner Report mailed Nov. 14, 2014", 3 pgs.

"Australian Application Serial No. 2012289870, Response filed Jan. 14, 2015", 20 pgs.

"Australian Application Serial No. 2012289870, Subsequent Examiners Report mailed Mar. 2, 2015", 3 pgs.

"International Application Serial No. PCT/US2012/027292, Search Report mailed Jun. 7, 2012", 2 pgs.

"International Application Serial No. PCT/US2012/027292, Written Opinion mailed Jun. 7, 2012", 5 pgs.

"International Application Serial No. PCT/US2012/049620, Search Report mailed Nov. 9, 2012", 2 pgs.

"International Application Serial No. PCT/US2012/049620, Written Opinion mailed Oct. 9, 2012", 4 pgs.

"International Application Serial No. PCT/US2012/049627, International Preliminary Report on Patentability mailed Feb. 13, 2014", 6 pgs.

"International Application Serial No. PCT/US2012/049627, Search Report mailed Oct. 12, 2012", 2 pgs.

"International Application Serial No. PCT/US2012/049627, Written Opinion mailed Oct. 12, 2012", 4 pgs.

"Korean Application Serial No. 2014-7005796, Office Action mailed Jan. 15, 2015", with English translation of claims, 9 pgs.

"Korean Application Serial No. 2014-7005796, Response filed Mar. 16, 2015", with English translation of claims.

"U.S. Appl. No. 13/566,857, Final Office Action mailed Aug. 25, 2015", 18 pgs.

(56) References Cited

OTHER PUBLICATIONS

"U.S. Appl. No. 13/566,857, Non Final Office Action mailed May 6, 2015", 16 pgs.
"U.S. Appl. No. 13/566,857, Response filed Jul. 6, 2015 to Non Final Office Action mailed May 6, 2015", 11 pgs.
"U.S. Appl. No. 13/566,857, Response filed Sep. 23, 2015 to Final Office Action mailed Aug. 25, 2015", 12 pgs.
"Australian Application Serial No. 2012289870, Response filed May 18, 2015", 21 pgs.
"Canadian Application Serial No. 2,844,060, Office Action mailed Jun. 10, 2015", 3 pgs.
"Canadian Application Serial No. 2,844,077, Office Action mailed Jun. 4, 2015", 4 pgs.
"Korean Application Serial No. 2014-7005795, Office Action mailed Jul. 29, 2015", w/ English Translation, 10 pgs.
"Korean Application Serial No. 2014-7005796, Notice of Final Rejection mailed May 27, 2015", with English translation of claims, 12 pgs.
"Korean Application Serial No. 2014-7005796, Reasons for Rejection mailed Sep. 18, 2015", w/ English Translation, 9 pgs.
"Canadian Application Serial No. 2,844,060, Response filed Dec. 7, 2015 to Office Action mailed Jun. 10, 2015", 13 pgs.
"Canadian Application Serial No. 2,844,077, Response filed Dec. 1, 2015 to Office Action mailed Jun. 4, 2015", 14 pgs.
"Korean Application Serial No. 2014-7005795, Response filed Oct. 29, 2015 to Office Action mailed Jul. 29, 2015", w/ English Claims, 16 pgs.
"Korean Application Serial No. 2014-7005796, Response filed Nov. 12, 2015 to Reasons for Rejection mailed Sep. 18, 2015", w/ English Claims, 22 pgs.

* cited by examiner

USER COMMENTARY SYSTEMS AND METHODS

RELATED APPLICATION

This application is a continuation of U.S. patent application Ser. No. 13/566,829, filed Aug. 3, 2012, and claims the priority benefit of U.S. Provisional Patent Application Ser. No. 61/515,254, filed Aug. 4, 2011, the benefit of priority of each of which is claimed hereby, and each are incorporated herein by reference in their entirety.

TECHNICAL FIELD

The present disclosure generally relates to data processing techniques and, more specifically, to systems and methods to enhance or enable shopping by a user or entity.

BACKGROUND

Advancements in computer and networking technology enable users and entities to conduct various types of transactions online via computer-based applications and systems. The increased use of mobile computing devices (e.g., smart phones and tablet computers) has expanded the manner in which users and entities can conduct online transactions. Additionally, the increase in mobile computing device usage results in more people watching video content on their mobile computing devices, and using their mobile computing device while simultaneously watching video content on a television or other display system.

BRIEF DESCRIPTION OF THE DRAWINGS

Some embodiments are illustrated by way of example and not limitation in the figures of the accompanying drawings.

DETAILED DESCRIPTION

Figure 1:
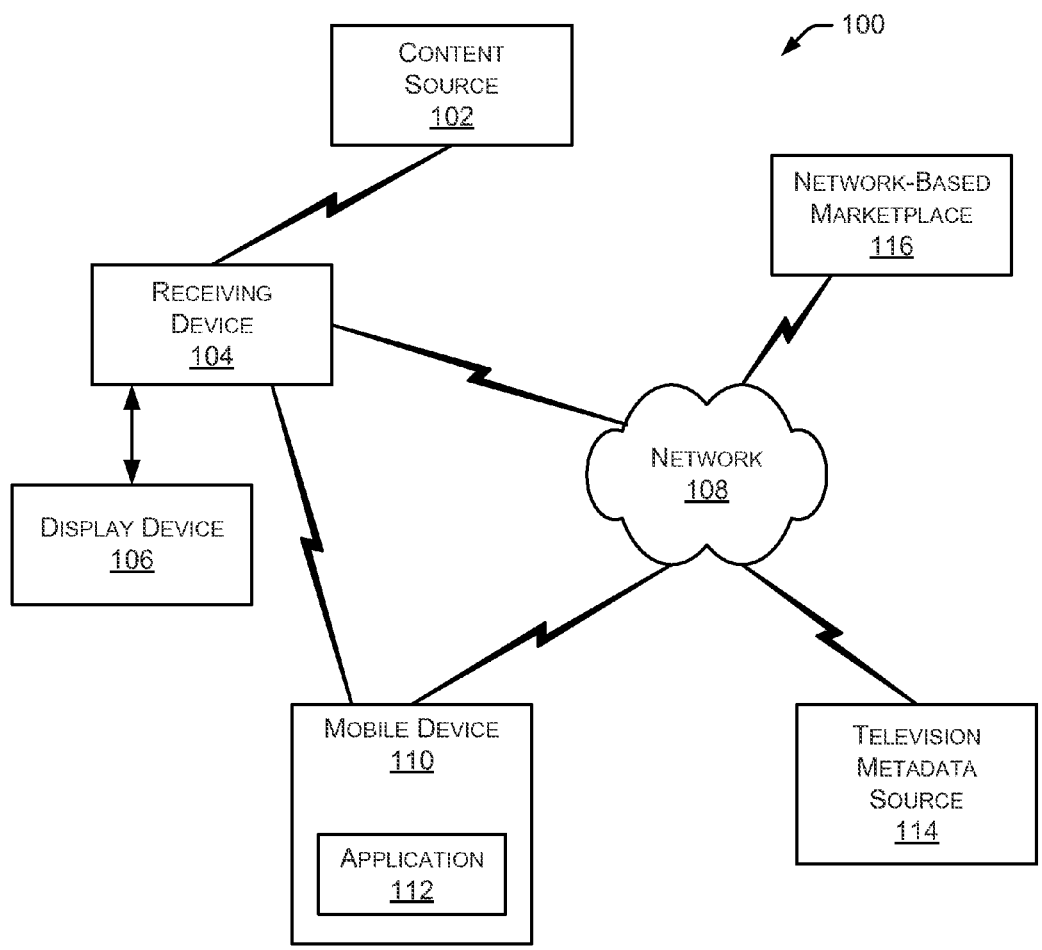
FIG. 1 is a block diagram depicting an example environment capable of implementing the systems and methods discussed herein.

Example systems and methods to generate and display product or service information related to program content, such as a television program, are described. In the following description, for purposes of explanation, numerous specific details are set forth in order to provide a thorough understanding of example embodiments. It will be evident, however, to one skilled in the art that the present invention may be practiced without these specific details.

The content display systems and methods described herein provide an enhanced browsing and shopping experience that enables a user to explore products or services associated with programming they are watching. This programming includes any type of content with a video component, such as television programs (recorded or live), movies, sporting events (recorded or live), concerts, and the like. The programming may be displayed on various types of devices, such as a television, monitor, video projector, computer screen, tablet computer, desktop computer, mobile computing device, and the like. While watching a program, the user can simultaneously utilize their mobile device (e.g., a tablet computer, smart phone, portable entertainment device or laptop computer) to learn more about the products or services displayed in (or mentioned in) the program. For example, the user can learn about clothing and accessory items worn by actors/actresses in the program, vehicles driven in the program, golf clubs used by players, and the like. The user can learn about the products shown in the program and may purchase one or more of the products through their mobile device.

Although specific examples discussed herein focus on fashion-related products, the content display systems and methods are applicable to any type of product or service. As used herein, a mobile device may also be referred to as a "portable device" or a "mobile computing device."

Particular embodiments allow a user to watch a program on a mobile device, a television, a desktop/laptop computer system or any other device capable of displaying the program. As the user watches the program, the content display systems and methods provide live information regarding related products currently available through a network-based marketplace, an online marketplace, an online store, a local store (i.e., geographically local to the user) or any other product source. The related product information may include a picture of the product, pricing information, source of the product (e.g., store), and other information that might be of interest to the user.

An application executing on the mobile device generates a user interface on the mobile device that allows a user to tag products, program scenes, images, and so forth by dragging them into a "stash tray" located along the bottom of the display. These tagged items are saved for later viewing, organizing, and sharing with other users. When the user is watching a program, they can interact with the product by selecting the product shown on the mobile device. For example, the user may request to receive additional product details regarding a particular product.

In some embodiments, the application executing on the mobile device has been "personalized" with information about the mobile device user. For example, the application may know the user's color preferences, clothing size, geographic location, and so forth. Using this personalized information, the application may display available clothing items (identified in a television program) having the appropriate size and color to match the user's preferences. The application is also capable of showing similar products or related products available from any number of different sources (e.g., different sellers). In a particular embodiment, available products are shown from multiple sources including both network-based marketplaces (showing cost and estimated shipping time) and local stores (showing cost and store location). This embodiment also allows a user to place a particular product on "hold" at a local store, ensuring availability of the product to the user.

FIG. 1 is a block diagram depicting an example environment 100 capable of implementing the systems and methods discussed herein. A content source 102 provides program content (e.g., television programs, movies, sporting events and other events) to any number of receiving devices 104. Content source 102 may also provide metadata associated with program content to receiving devices 104. Content source 102 includes, for example, a broadcast head end (e.g., cable or satellite provider head end), a terrestrial broadcast system or a server that distributes program content via a data communication network. Receiving device 104 includes, for example, a cable receiver, a satellite receiver, a set top box, an Internet-based streaming device, a game console, a DVD player with Internet-based streaming capabilities, a computing system, and the like. Receiving device 104 may include decoding modules that decode (or decrypt) received program content. Additionally, receiving device 104 includes one or more processors, memory devices, communication modules, and so forth that allow the receiving device 104 to process received program content and generate one or more display signals that allow the program content to be rendered by an attached display device.

A display device 106 (e.g., a television, computing device or monitor) is coupled to receiving device 104 to receive video program data (e.g., display signals) from receiving device 104. In alternate embodiments, receiving device 104 is incorporated into display device 106. Display device 106 may receive program content from multiple receiving devices 104.

A data communication network 108 is coupled to various devices and systems to distribute program content to multiple receiving devices 104 and multiple display devices 106. As shown in FIG. 1, data communication network 108 is coupled to receiving device 104, a mobile device 110, a television metadata source 114, and a network-based marketplace 116. In alternate embodiments, one or more content sources 102 and one or more display devices 106 are also coupled to network 108. Data communication network 108 represents any type of data communication network, such as the Internet. In some embodiments, data communication network 108 includes multiple networks communicating with one another.

Mobile device 110 includes any computing device capable of performing the operations discussed herein, such as a tablet computer, smart phone, portable entertainment device or laptop computer. Mobile device 110 communicates with data communication network 108 and/or directly with receiving device 104. Additionally, mobile device 110 can communicate with other systems and components, such as content source 102, display device 106, television metadata source 114, and network-based marketplace 116. Although not shown in FIG. 1, mobile device 110 may communicate with other systems and components through a mobile communication network (e.g., a cellular network).

Mobile device 110 includes an application 112 stored therein (e.g., stored in a non-volatile memory device within mobile device 110). Application 112 receives various data (e.g., television program information, product or service information, and network-based marketplace listings) and generates a display of information for a user of the mobile device 110. As discussed herein, the display of information may include product or service information associated with products or services shown in a particular television program or other program content. Application 112 also generates a graphical user interface that allows the mobile device user to interact with, for example, the displayed information.

Television metadata source 114 provides data associated with various program content. This data includes, for example, television program titles, description, actors and actresses that appear in the program, as well as specific products or services that are displayed during the program. The information regarding specific products or services may include a product name, product brand, product identifier (e.g., a SKU (stock keeping unit)), product description, and the like. As discussed herein, the metadata received from television metadata source 114 may be displayed on a display device 106 adjacent the program content, or on a mobile device 110 for the benefit of a user of the mobile device 110 who is also watching the program content on a display device 106. In some embodiments, the television metadata is generated in substantially real-time for a live event, such as a sporting event. In other embodiments, the television metadata is generated after the program content has been created or concurrently with the program content creation.

Network-based marketplace 116 provides an electronic commerce marketplace for users to shop and perform various network-based transactions. Any number of users can access network-based marketplace 116 through one or more data communication networks, such as data communication network 108. In a particular embodiment, mobile device 110 accesses network-based marketplace 116 to locate product listings in the network-based marketplace 116 that are shown in the program content being viewed by a user. Alternatively, mobile device 110 can access network-based marketplace 116 to locate product listings for similar items (e.g., product listings that are similar to the products shown in the program content being viewed by the user).

Figure 2:
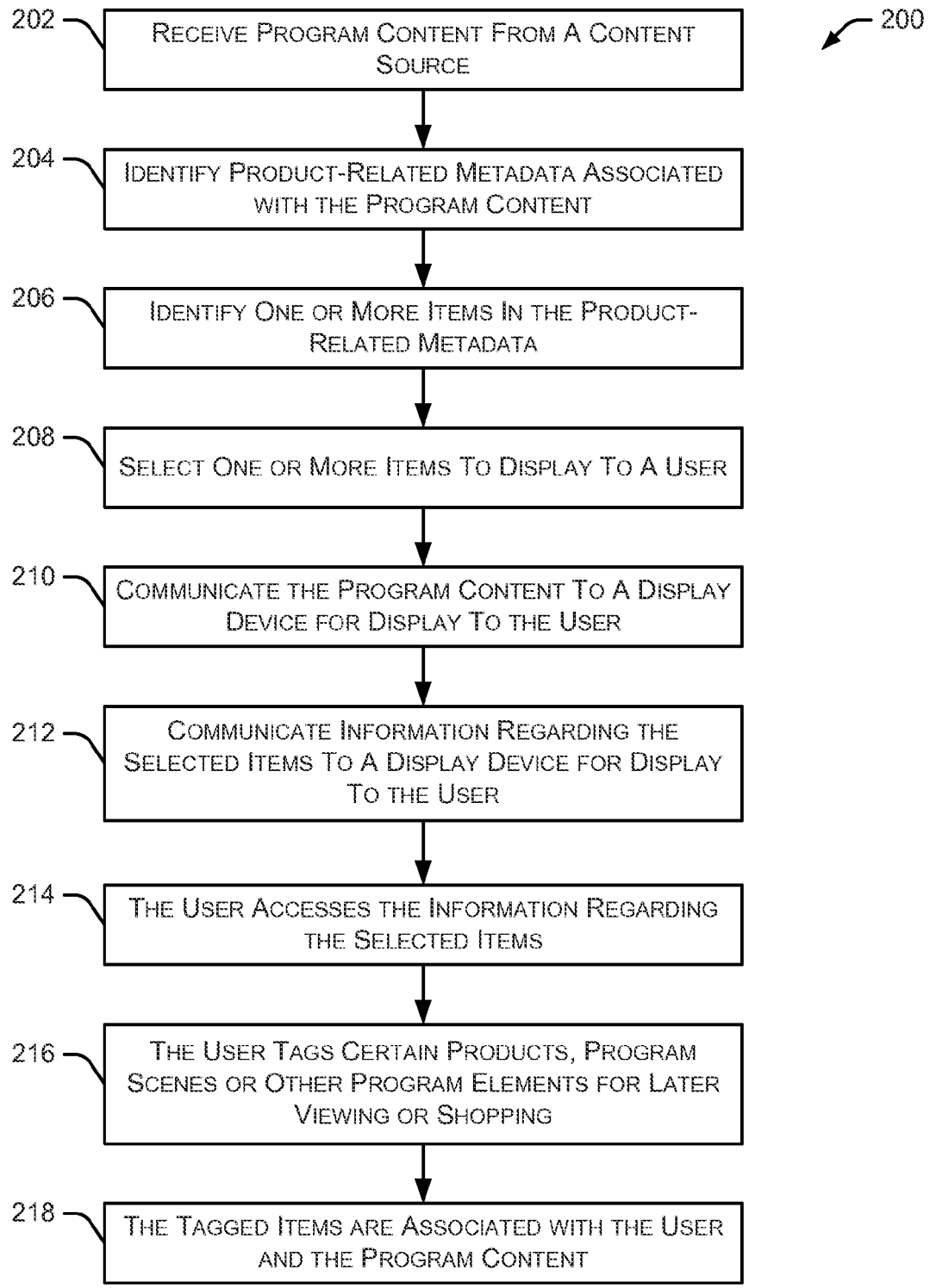
FIG. 2 is a flow diagram of a method, in accordance with an embodiment, for displaying product or service information associated with a television program on a mobile device.

FIG. 2 is a flow diagram of a method 200, in accordance with an embodiment, for displaying product or service information associated with a television program on a mobile device. Although the specific example of FIG. 2 discusses a television program displayed on a television, similar procedures are applicable to any type of content displayed on any type of device.

Initially, program content is received from a content source at 202. For example, a television may receive program content from a content source (e.g., content source 102 in FIG. 1) through a receiving device (e.g., receiving device 104 in FIG. 1). Method 200 also identifies product-related metadata associated with the program content at 204. The product-related metadata includes information related to products or services shown or described in the program content. The product-related metadata can be received by the television directly, or inserted into a display signal generated by a receiving device. For example, the product-related metadata may be included in the program content data received from the content source. Alternatively, the product-related metadata may be received by a receiving device and communicated to the television by the receiving device.

In particular embodiments, the product-related metadata identifies particular locations (e.g., temporal locations) at which the products or services are shown within the program content. These location identifiers allow one or more devices to match appropriate product information with the current program content scene being displayed. For example, the product-related metadata may include time or scene information that associates particular products or services with the scenes in the program content. The product-related metadata may be generated by one or more human operators, a machine, and the like.

The method 200 continues by identifying one or more items (e.g., products or services) in the product-related metadata at 206. Method 200 then selects one or more items from the product-related metadata to display to a user at 208. The program content is then communicated to a display device (e.g., a television) for display to the user at 210. Additionally, the information regarding the items selected at 208 is communicated to the display device for display to the user at 212. In alternate embodiments, the information regarding the items selected at 208 is communicated to a separate device, such as a mobile device, for display to the user. In some implementations, the program content is displayed to the user via the display device at substantially the same time the information regarding the selected items is displayed to the user via the separate device.

In a particular embodiment, the user is a viewer of the program content who is also using a mobile device while watching the program content. The items selected from the product-related metadata are communicated to, and received by, the mobile device. The mobile device can communicate to receive information regarding the items selected from the product-related metadata from the television, the receiving device, the content source, the television metadata source or any other data source. In this embodiment, the mobile device displays the selected items to the user on the mobile device. For example, the mobile device may display information about various products visible in the current scene, such as clothing, jewelry, purses, and so forth. Through the mobile device, the user can access various product-related information regarding the selected items at 214. For example, if the user likes an article of clothing shown in the current scene, they can get more information, such as the manufacturer of the clothing and where the clothing can be purchased. In this example, the mobile device may display listings in a network-based marketplace for the product, as well as online stores and local stores that sell the product. Additionally, the mobile device may display alternate clothing articles that are similar to the product shown in the current scene.

When viewing program content, a user can tag (or otherwise identify) certain products, services, program scenes, and other program elements for later viewing or shopping at 216. Additionally, the tagged items are associated with the user as well as the program content at 218. This association allows the user to remember, for example, the program content in which the tagged items appeared or were mentioned.

In some embodiments, if a user sees a product they want to learn about (after viewing the television program), they can tag the product (or tag the scene in which the product is displayed) for later viewing. As shown, for example, in FIGS. 5-7, the tagged products or scenes can be organized into different categories, such as shirts, shoes, jewelry, and miscellaneous items. These tagged products or scenes can be accessed at a later time to learn more about the products, share information about the products with other users (e.g., friends and social networks) or shop for one or more products. Additionally, a user may specify where the tagged content or tag metadata is stored (e.g., in the user's mobile device or in the network-based marketplace). In particular embodiments, a user may specify that the tagged content or tag metadata is stored in the network-based marketplace and associated with the user's account in the network-based marketplace. These embodiments allow a user to retrieve the tagged content and tagged metadata from any device by accessing their account with the network-based marketplace.

Figure 3:
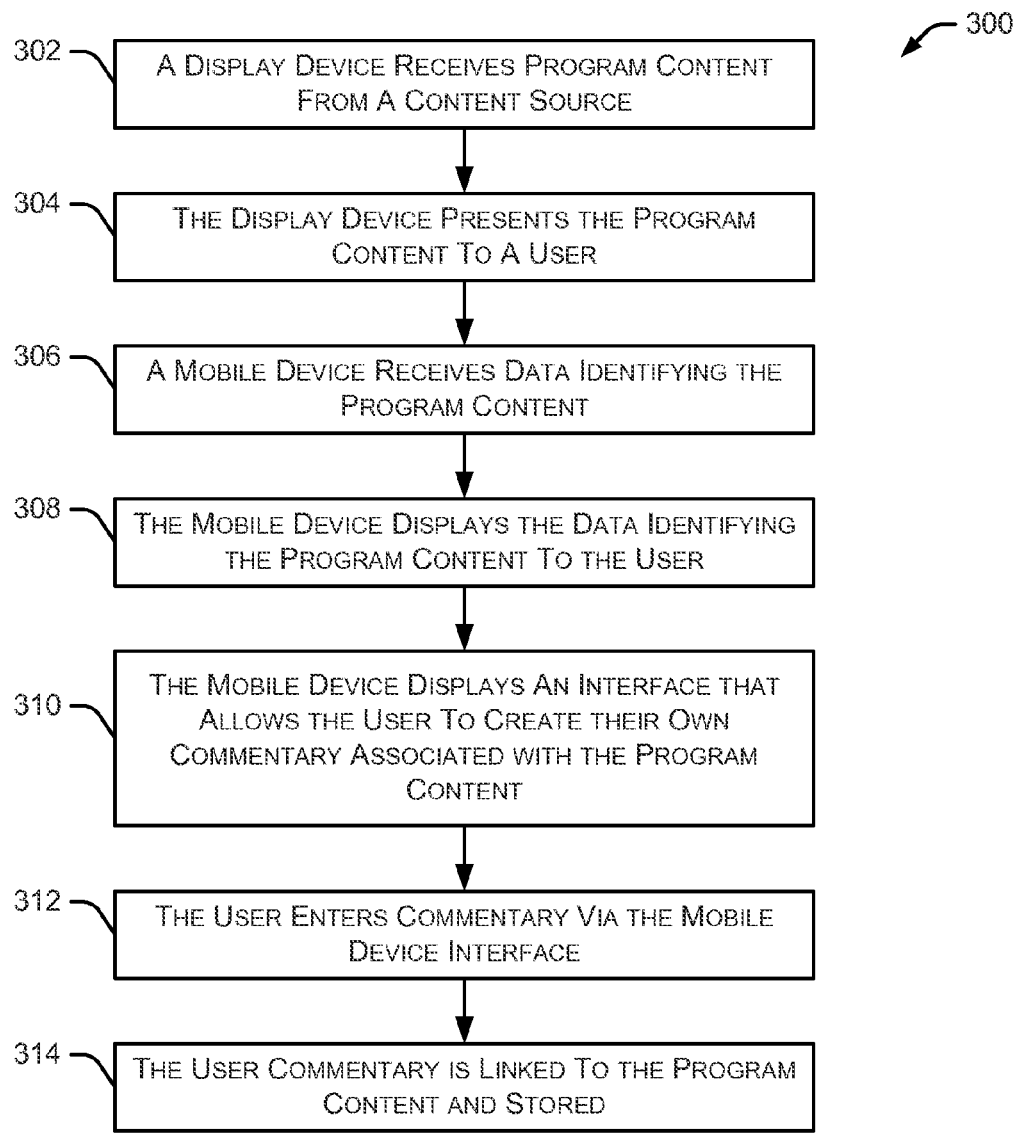
FIG. 3 is a flow diagram of a method, in accordance with an embodiment, for allowing a user to provide commentary related to program content.

FIG. 3 is a flow diagram of a method 300, in accordance with an embodiment, for allowing a user to provide commentary related to program content. Initially, a display device receives program content from a content source at 302. For example, the display device may receive program content from a content source (e.g., content source 102 in FIG. 1) through a receiving device (e.g., receiving device 104 in FIG. 1). The display device presents the program content to a user at 304. The method 300 continues as a mobile device receives data identifying the program content at 306 and displays the data identifying the program content to the user at 308. The mobile device further displays an interface (e.g., a graphical user interface) that allows the user to create their own commentary associated with the program content at 310. The user enters commentary via the mobile device interface at 312. The user commentary is then linked (or tagged) to the program content and stored at 314. The stored commentary can be retrieved at a later time by the user who created the commentary or by another user, entity or system. A user may specify where the commentary is stored (e.g., in the user's mobile device or in the network-based marketplace). In particular embodiments, a user may specify that the commentary is stored in the network-based marketplace and associated with the user's account in the marketplace. These embodiments allow a user to retrieve the commentary from any device by accessing their account with the network-based marketplace.

The user's commentary may include their rating (or opinion) of the program content, a summary of the program content, descriptions of characters or scenes, and the like. In particular embodiments, a marketplace (e.g., a network-based marketplace) is provided that allows users to access commentaries of other users as well as experts, actors, directors, producers or other individuals associated with the program content. For example, a commentary marketplace allows fans of a particular television program or movie to access commentaries associated with the television program or movie. In particular implementations, the commentaries can be viewed (or listened to) while watching the television program or movie. Alternatively, the commentaries can be viewed (or listened to) separately from viewing the television program or movie.

Figure 4:
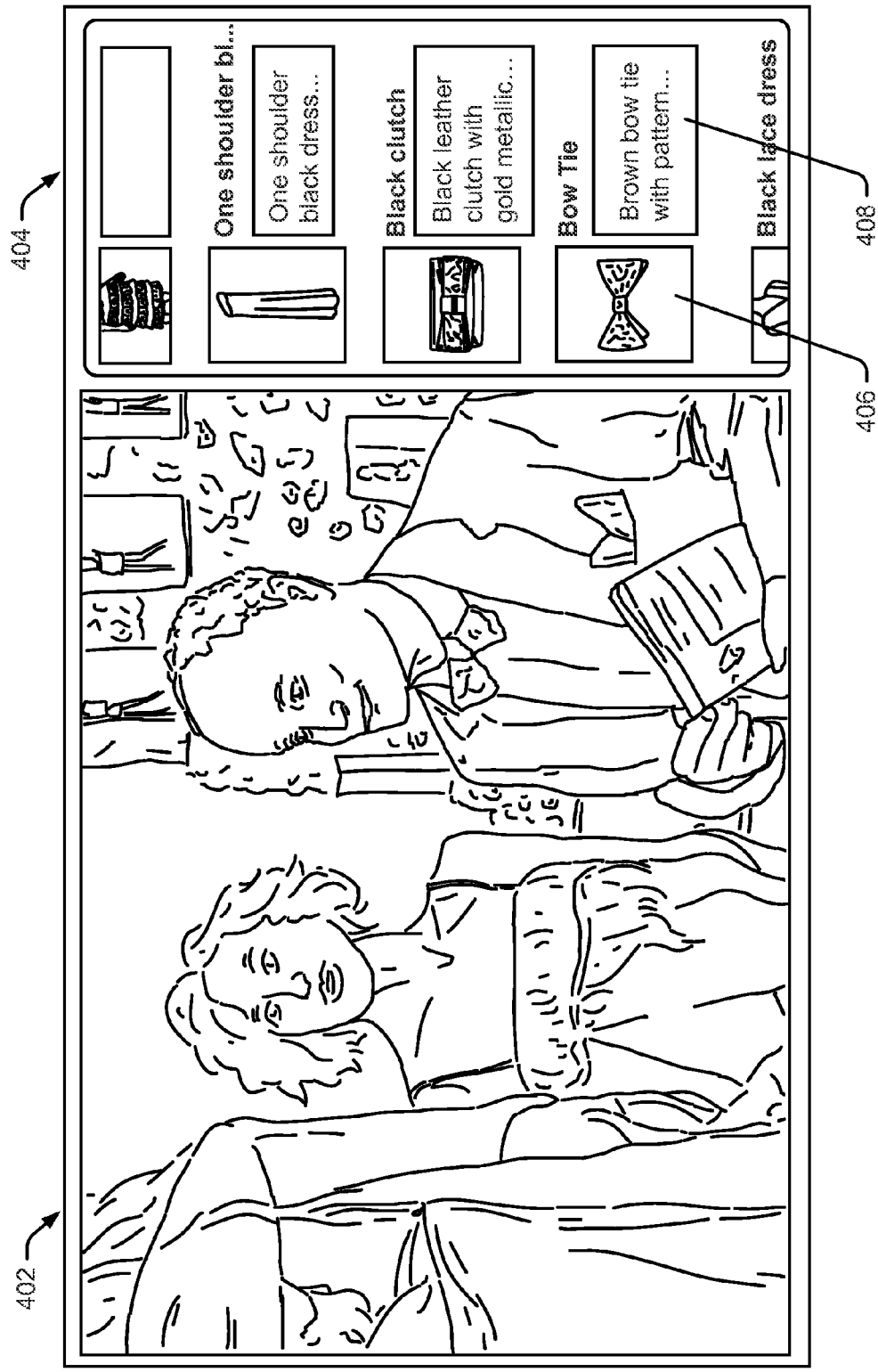
FIG. 4 depicts, in accordance with an embodiment, an example scene in a television program and associated product information.

FIG. 4 depicts, in accordance with an embodiment, an example scene in a television program and associated product information. In various embodiments, the scene and product information shown in FIG. 4 are displayed on a television, mobile device, computer or any other device having an appropriate display mechanism. FIG. 4 illustrates a program display portion 402 that shows a television program being viewed by a user. The television program being viewed can be a live television broadcast/stream or a recorded program. FIG. 4 also illustrates a product display portion 404, which shows product information associated with the program or scene shown in program display portion 402. In this example, product display portion 404 includes information related to clothing items worn by actors/actresses in the television program as well as a purse (black clutch) shown during the television program. In particular, FIG. 4 shows a picture of a bow tie 406 similar to one worn by the actor in the television program, as well as a brief description 408 of the bow tie. Additionally, product display portion 404 may include information related to clothing items discussed in the television program (e.g., a television program about the fashion industry in which the commentators discuss various clothing items or accessories).

Product display portion 404 may include, for example, names and manufacturers of clothing items, item descriptions, item photos, price, and one or more stores or network-based marketplaces at which the item is available for purchase. As the images in program display portion 402 change, the items and information shown in product display portion 404 also change. In a particular embodiment, the items and information shown in product display portion 404 are continually scrolling to show a variety of available clothing items. Although product display portion 404 is shown in FIG. 4 as being positioned to the right of program display portion 402, in alternate embodiments, product display portion 404 may be located anywhere in the display area (e.g., along the left side of program display portion 402, or along the top or bottom of program display portion 402).

If program display portion 402 and product display portion 404 are presented on a television or computing device, the user may select a particular item shown in product display portion 404 by, for example, touching or clicking on the product information or product image. Alternatively, the user may view the television program and associated product information on a television or other display device, but select particular items using another system or device, such as a mobile device.

Figure 5:
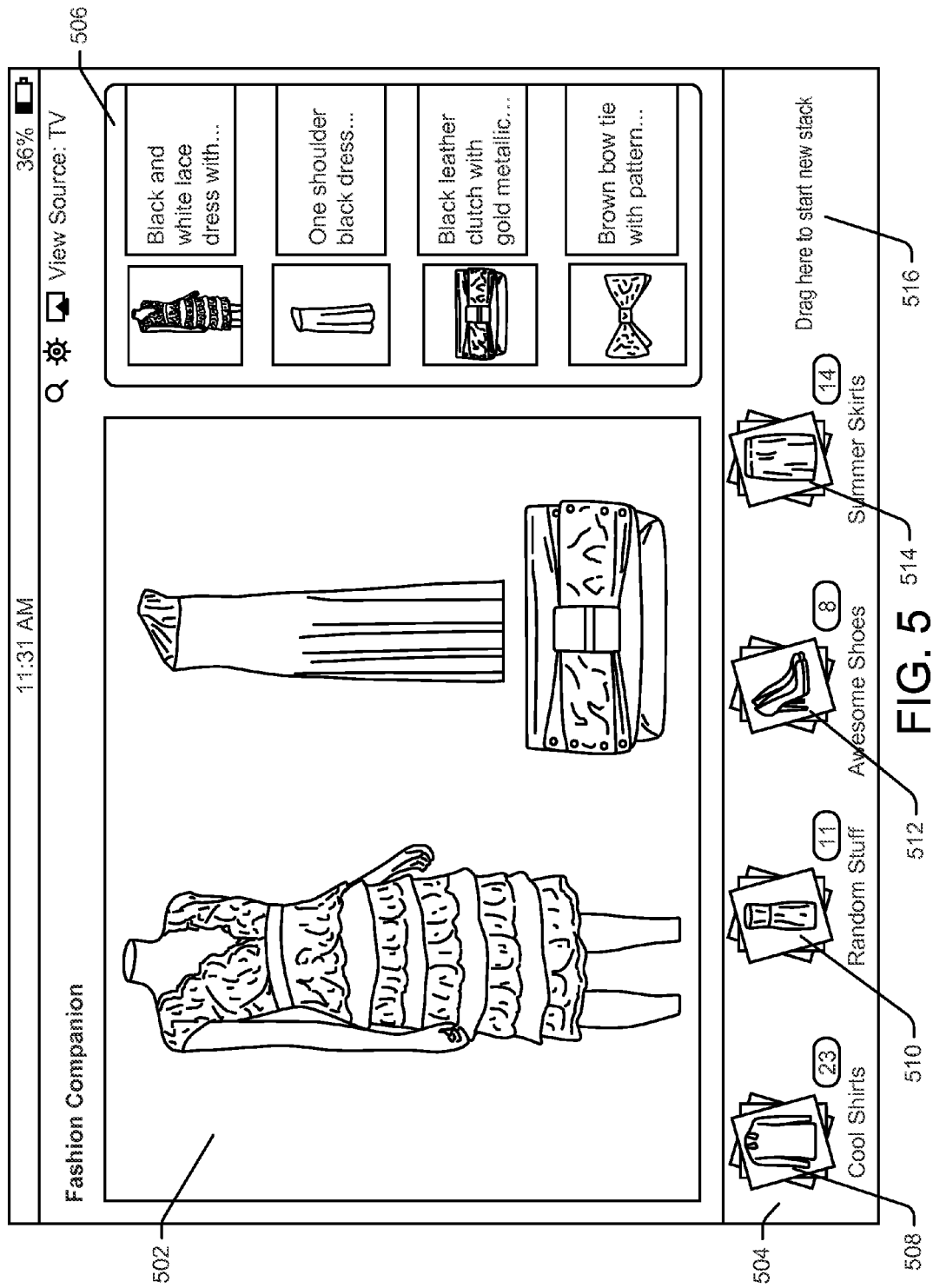
FIGS. 5-7 depict, in accordance with an embodiment, example displays on a mobile device containing product information associated with a television program.
Figure 6:
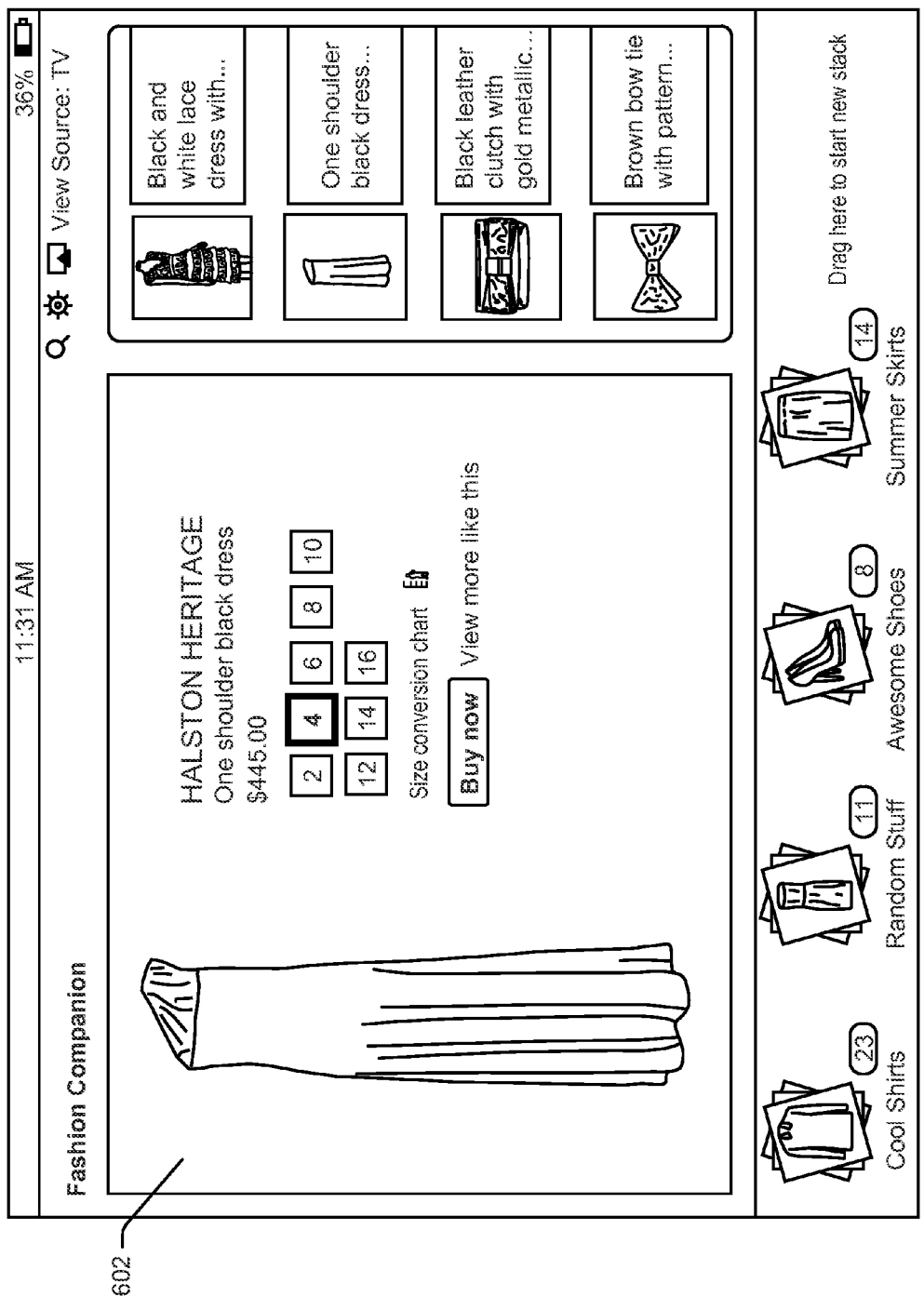
Figure 7:
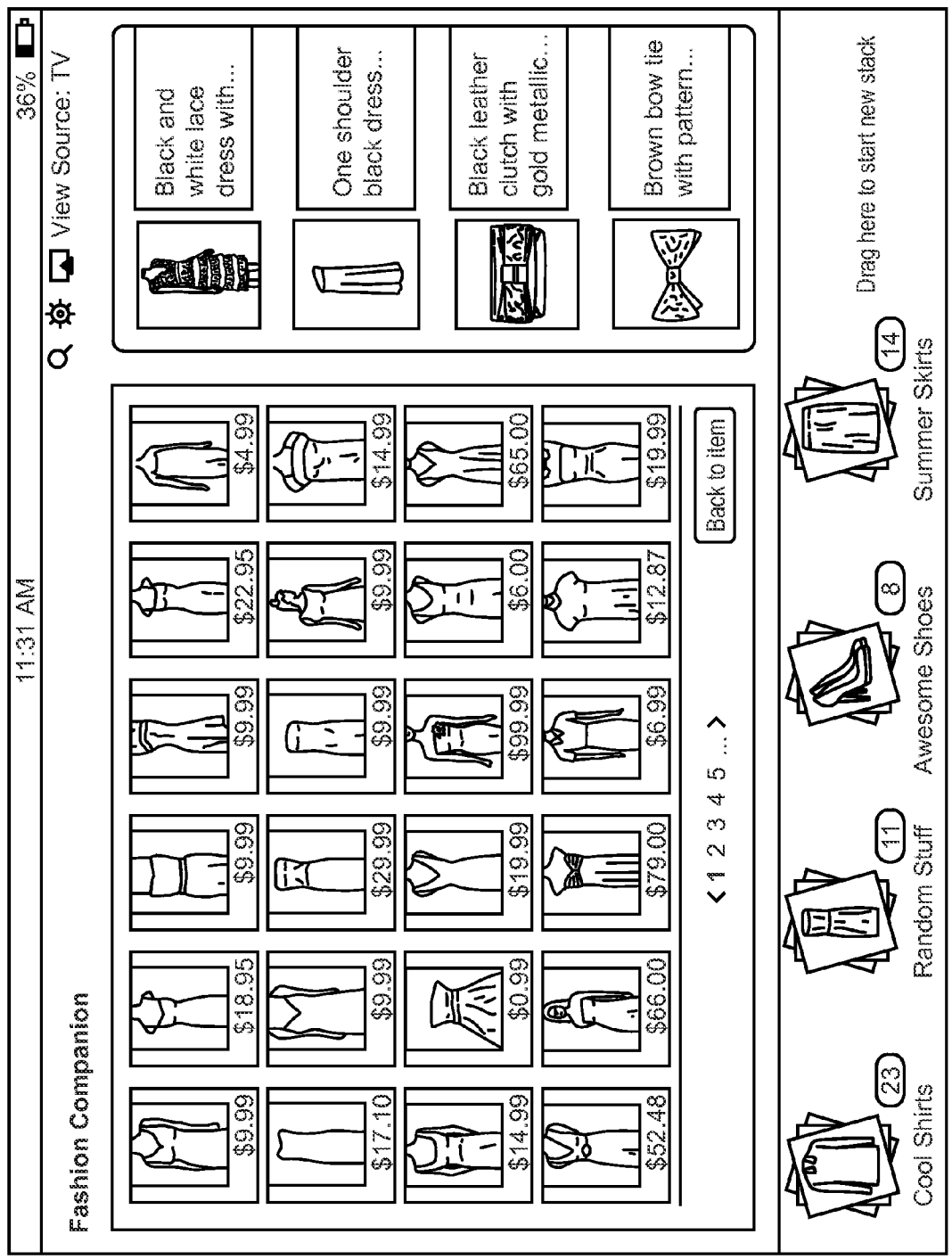

FIGS. 5-7 depict, in accordance with an embodiment, example displays on a mobile device containing product information associated with a television program or other program content. FIG. 5 illustrates an example display presented on a mobile device, such as a tablet computer or a smart phone. A first display portion 502 includes images of various products displayed or discussed during a program, such as dresses and purses. In an alternate embodiment, first display portion 502 may display program content, such as a television program. For example, clicking the "View Source: TV" button in the top-right corner of the display changes first display portion 502 to display program content.

A tagging display portion 504 provides various product categories (cool shirts 508, random stuff 510, awesome shoes 512, and summer skirts 514) of products or services tagged by a user. For example, a user may tag various products, services, program scenes or other images and associate each tagged item with one of the categories. In a particular implementation, to tag an item, the user clicks on the item and drags it to the desired category. At a later time, the user can access all items in a particular category by clicking on a desired category icon in tagging display portion 504. To start a new category, the user can click an item and drag it to the right edge of tagging display portion 504 (in the area 516 labeled "Drag here to start new stack").

A product display portion 506 includes, for example, names and manufacturers of clothing items, item photos, and a product summary. As the images in the associated television program change, the items and information shown in product display portion 506 also change. In a particular embodiment, the items and information shown in product display portion 506 are continually scrolling to show a variety of available items. In some embodiments, the items shown in product display portion 506 are the same as the items shown in product display portion 404 of FIG. 4.

In an example embodiment, when a user clicks on one of the items shown in product display portion 506, additional information about the item is displayed in first display portion 502. This additional information may include additional item photos, a more detailed product description, product reviews, pricing information, stores or network-based marketplaces that sell the product, and the like.

For example, FIG. 6 illustrates an example display in which specific details of a selected item (Halston Heritage one shoulder black dress) are shown in a display portion 602. In this example, the available sizes of the dress are shown and a particular size has been selected (size 4) based on a user profile, user preferences or other information known about the user. A "Buy now" button allows the user to purchase the dress through a local store, online store, network-based marketplace or other source.

FIG. 7 illustrates another example display in which multiple products are displayed to the user. In this example, the user has selected the same dress as discussed above in FIG. 6. However, the example display of FIG. 7 shows multiple dresses, which may include the selected dress as well as similar dresses that may be of interest to the user. Additionally, the price of each of the multiple dresses is shown adjacent a photo of the dress.

Referring again to FIG. 5, the first display portion 502, the tagging display portion 504, and the product display portion 506 are shown in a particular arrangement with respect to one another. However, alternate embodiments may arrange display portions 502-506 in any manner. Additionally, the size and shape of each display portion 502-506 can be modified to meet user preferences, accommodate display screen dimensions, and so forth. Alternate embodiments may include additional display portions or fewer display portions as compared to the example of FIG. 5. Similar alternatives can be implemented with respect to the example displays shown in FIGS. 6 and 7.

Figure 8:
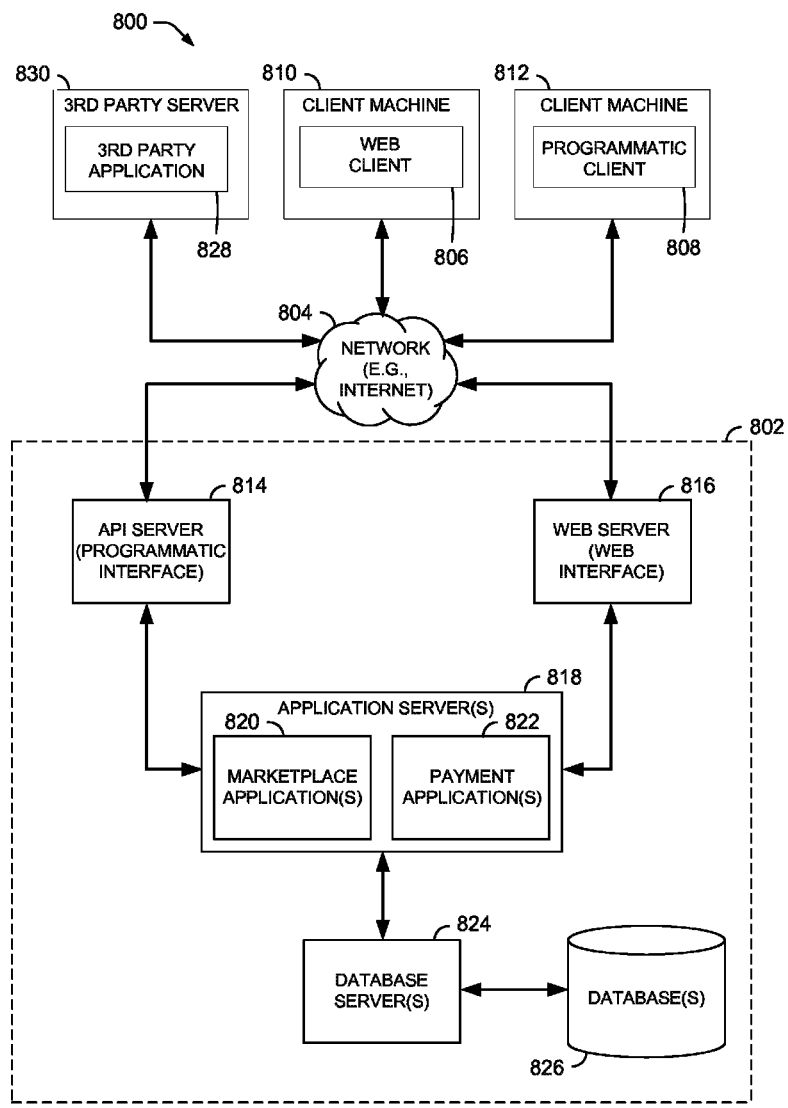
FIG. 8 is a network diagram depicting a client-server system within which an example embodiment may be deployed.

FIG. 8 is a network diagram depicting a client-server system 800, within which one example embodiment may be deployed. A networked system 802, in the example form of a network-based marketplace or publication system, provides server-side functionality, via a network 804 (e.g., the Internet or Wide Area Network (WAN)) to one or more clients. FIG. 8 illustrates, for example, a web client 806 (e.g., a browser, such as the Internet Explorer browser developed by Microsoft Corporation of Redmond, Wash.), and a programmatic client 808 executing on respective client machines 810 and 812.

An Application Programming Interface (API) server 814 and a web server 816 are coupled to, and provide programmatic and web interfaces respectively to, one or more application servers 818. Application servers 818 host one or more marketplace applications 820 and payment applications 822. Application servers 818 are, in turn, shown to be coupled to one or more database servers 824 that facilitate access to one or more databases 826.

Marketplace applications 820 may provide a number of marketplace functions and services to users that access networked system 802. Payment applications 822 may likewise provide a number of payment services and functions to users. Payment applications 822 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 820. While the marketplace and payment applications 820 and 822 are shown in FIG. 8 to both form part of networked system 802, it will be appreciated that, in alternative embodiments, payment applications 822 may form part of a payment service that is separate and distinct from networked system 802.

Further, while the system 800 shown in FIG. 8 employs a client-server architecture, the present invention is of course not limited to such an architecture, and could equally well find application in a distributed, or peer-to-peer, architecture system, for example. The various marketplace and payment applications 820 and 822 could also be implemented as standalone software programs, which do not necessarily have networking capabilities.

Web client 806 accesses the various marketplace and payment applications 820 and 822 via the web interface supported by web server 816. Similarly, programmatic client 808 accesses the various services and functions provided by the marketplace and payment applications 820 and 822 via the programmatic interface provided by API server 814. Programmatic client 808 may, for example, be a seller application (e.g., the TurboLister application developed by eBay Inc., of San Jose, Calif.) to enable sellers to author and manage listings on networked system 802 in an off-line manner, and to perform batch-mode communications between programmatic client 808 and networked system 802. Some embodiments of the present invention may be implemented by components of the marketplace application(s) 820.

FIG. 8 also illustrates a third party application 828, executing on a third party server machine 830, as having programmatic access to networked system 802 via the programmatic interface provided by API server 814. For example, third party application 828 may, utilizing information retrieved from networked system 802, support one or more features or functions on a website hosted by the third party. The third party website may, for example, provide one or more promotional, marketplace or payment functions that are supported by the relevant applications of the networked system 802.

Figure 9:
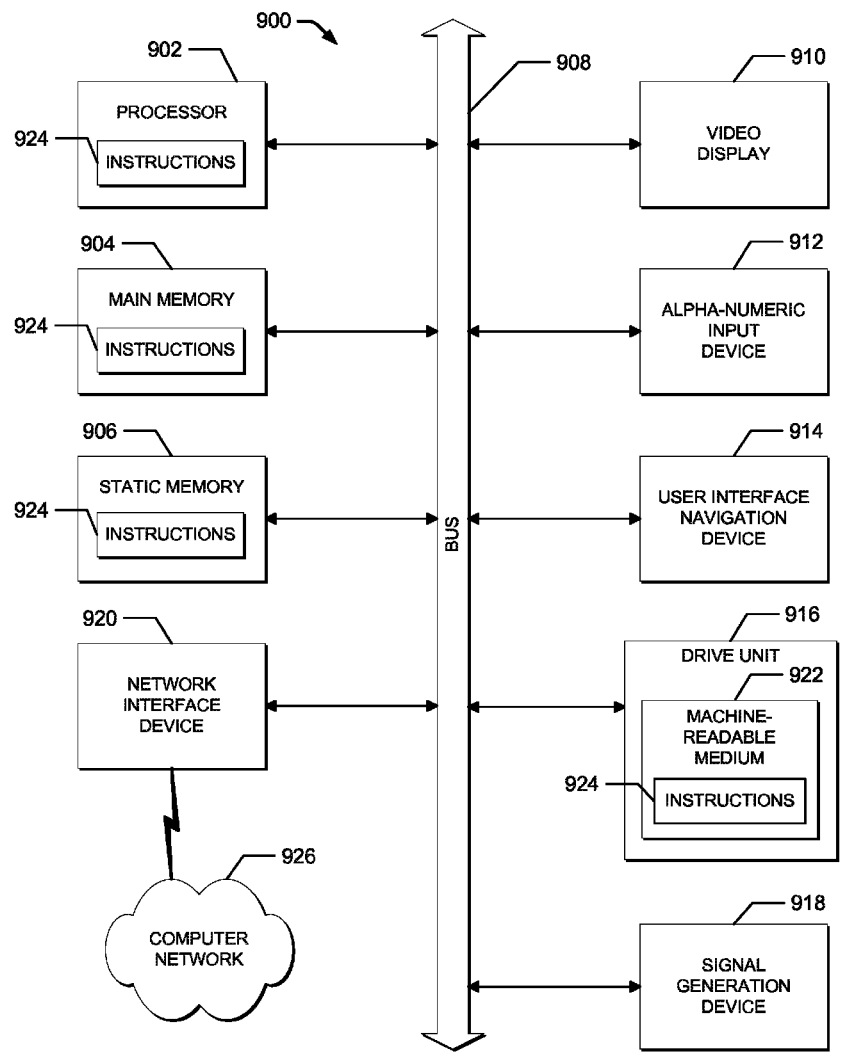
FIG. 9 is a block diagram of a machine in the example form of a computer system within which a set of instructions, for causing the machine to perform any one or more of the methodologies discussed herein, may be executed.

FIG. 9 shows a diagrammatic representation of machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (RDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable storage medium 922 on which is stored one or more sets of instructions (e.g., software) 924 embodying any one or more of the methodologies or functions described herein. The software 924 may also reside, completely or at least partially, within the main memory 904, within the static memory 906, and/or within the processor 902 during execution thereof by the computer system 900, the main memory 904 and the processor 902 also constituting machine-readable media. The software 924 may further be transmitted or received over a network 926 via the network interface device 920.

While the machine-readable storage medium 922 is shown in an example embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instructions for execution by the machine and that cause the machine to perform any one or more of the methodologies of the present invention. The term "machine-readable storage medium" shall accordingly be taken to include, but not be limited to, non-transitory solid-state memories, optical and magnetic media, and the like.

Thus, content display systems and methods have been described. Although the present invention has been described with reference to specific example embodiments, it will be evident that various modifications and changes may be made to these embodiments without departing from the broader scope of the invention. Accordingly, the specification and drawings are to be regarded in an illustrative rather than a restrictive sense.

In the foregoing description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the description, with each claim standing on its own as a separate embodiment.

What is claimed is:

1. A method for generating a composite rating about a first user, the method comprising:
   receiving a plurality of ratings about the first user from a plurality of second users, each of the ratings associated with a transaction between the first user and one of the second users;
   classifying, using at least one processor, the first user based on a number of the transactions;
   determining the second users that submitted the ratings from the received plurality of ratings that satisfy a pre-determined profile, the pre-determined profile being in accordance with the classification of the first user;
   adjusting the ratings from at least one of the second users that satisfy the pre-determined profile and which exceed a specific rating on a ratings scale comprising a lowest value rating and a highest value rating; and
   generating the composite rating about the first user using the adjusted ratings and remaining ratings from the received plurality of ratings.

2. The method of claim 1, wherein the first user comprises a seller and the second users comprise buyers.

3. The method of claim 1, wherein classifying the first user comprises classifying the first user as a high volume ratee or a low volume ratee.

4. The method of claim 3, wherein the first user is a low volume ratee and the pre-determined profile comprises one of the second user contributing more than 50% of the ratings that match a specific rating from among all ratings in the received plurality of ratings that match the specific rating.

5. The method of claim 3, wherein the first user is a high volume ratee and the pre-determined profile comprises more than one of the second users combined contributing more than 50% of the ratings that match a specific rating from among all ratings in the received plurality of ratings that match the specific rating.

6. The method of claim 1, wherein the plurality of ratings comprise the ratings for a first metric pertaining to the transactions.

7. The method of claim 6, further comprising:
   receiving a plurality of second ratings about the first user from a plurality of second users, wherein each of the second ratings is associated with a second metric of the transactions between the first user and one of the second users, the first metric and the second metric being different from each other;

adjusting the second ratings from at least one of the second users that satisfy the pre-determined profile and which exceed the threshold; and generating a second composite rating about the first user using the adjusted second ratings and the remaining second ratings.

8. The method of claim 7, further comprising:
selecting between the composite rating and the second composite rating for an overall composite rating about the first user.

9. The method of claim 8, further comprising:
setting an average of the plurality of ratings for the first metric as the overall composite rating when the composite rating is selected over the second composite rating and the composite rating is less than the average of the plurality of ratings for the first metric.

10. A non-transitory computer readable medium including instructions, when executed by a processor, causes the processor to perform operations comprising:

calculating a contribution amount of specific ratings from a second user to all ratings from a plurality of second users, wherein the ratings from the plurality of the second users pertain to a performance metric of a high volume first user and the specific ratings are ratings having a particular value from a ratings scale and wherein the calculating of the contribution amount comprises calculating the contribution amount of the specific ratings from more than one of the second users with the highest counts of the specific ratings;

in response to the contribution amount exceeding a threshold value, changing a count of the specific ratings from the second user to an another count; and calculating a composite rating for the performance metric of the first user based on the another count of the specific ratings and the ratings of the remaining second users.

11. The computer readable medium of claim 10, wherein the specific ratings is at least a lowest ratings value from the ratings scale.

12. The computer readable medium of claim 10, wherein the specific ratings is at least a highest ratings value from the ratings scale.

13. The computer readable medium of claim 10, wherein the another count is a single count.

14. The computer readable medium of claim 10, further comprising classifying the first user as a low volume user or a high volume user based on a transaction count.

15. The computer readable medium of claim 10, wherein the ratings comprises at least one of a feedback, an evaluation, a review, an opinion, a testimonial, or a commentary.

16. A system comprising:
a non-transitory storage device including a plurality of feedbacks about a first user from a plurality of second users, each of the feedback associated with a transaction between the first user and the one of the second users; and a computing device in communication with the storage device and configured to:
classify the first user based on a number of the transactions,
determine the second users that submitted the feedbacks that satisfy a pre-determined profile, the pre-determined profile being in accordance with a classification of the first user,
adjust the feedbacks from at least one of the second users that satisfy the pre-determined profile and which exceed a specific rating on a ratings scale comprising a lowest value rating and a highest value rating, and
generate a composite feedback about the first user using the adjusted feedbacks and remaining feedbacks in the storage device.

* * * * *